Figure 1:
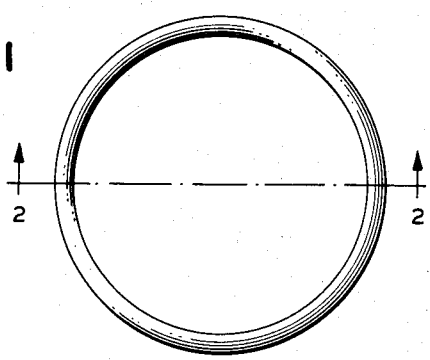

Sept. 6, 1955 U. JELINEK 2,717,024
GASKET AND METHOD OF FORMING SAME
Filed Sept. 17, 1952

ULRICH JELINEK
*INVENTOR.*

BY G. H. Palmer
Benjamin I. Kaufman

ATTORNEYS

United States Patent Office 2,717,024
Patented Sept. 6, 1955

2,717,024

GASKET AND METHOD OF FORMING SAME

Ulrich Jelinek, Springfield, N. J., assignor to The M. W. Kellogg Company, Jersey City, N. J., a corporation of Delaware Application September 17, 1952, Serial No. 310,051

16 Claims. (Cl. 154—33.1)

This invention relates to insulating compositions and the method of preparing them. In one aspect, the invention relates to insulating compositions in the form of gaskets covered with a polymer of trifluorochloroethylene. More particularly in this aspect, the invention relates to resilient solid insulating compositions in the form of gaskets covered with a solid polymer of trifluorochloroethylene.

The manufacture of insulating compositions, in the form of gaskets, possessing elasticity or shape-retaining properties is not new. Gaskets having such properties are particularly useful in turbines, motors, generators, or other forms of machines requiring gaskets or nose-seals which can effectively function at high speeds and under high pressures, while undergoing distortion and even some abrasion under such conditions. Various materials possessing such elastic or resilient properties have been heretofore employed in the manufacture of shape-retaining gaskets or seals. Such materials include rubber (both natural and synthetic), various thermoplastic compositions, and various reinforced and impregnated plastics. It has been found, however, that in many industrial applications, gaskets made of such materials are not chemically resistant when exposed to various powerful oxidizing agents, in the course of performing their mechanical functions, such as fuming nitric acid, sulfuric acid, hydrofluoric acid, motor fuels used as rocket propellants, and various reagents such as aqua regia, hydrochloric acid, other strong acids and strong caustic solutions. Exposure of gaskets, manufactured from such materials, results in their rapid deterioration, impaired efficiency and relatively short useful life. It is, therefore, desirable to provide an improved gasket composed of materials which not only possess the aforementioned structural elasticity and shape-retaining properties, but which also are chemically resistant to attack or deterioration by any of the aforementioned oxidizing agents, motor fuels or reagents.

In application S. N. 234,284, filed June 29, 1951, in the name of Alexander C. Hetherington, and in my prior and co-pending application S. N. 302,058, filed August 1, 1952, are disclosed the preparation of insulating compositions in the form of gaskets and O rings, comprising a resilient solid material as a core and covered with a relatively thin contiguous sheath comprising a polymer of trifluorochloroethylene. These articles have been found to be more chemical and abrasion resistant, while at the same time, possessing a substantially similar overall modulus of elasticity as gaskets and O rings comprised of the same resilient solid material, but without the additional covering of the aforementioned polymer of trifluorochloroethylene. These articles covered with a sheath of polymeric trifluorochloroethylene, in addition to possessing the aforementioned chemical and abrasion-resistant advantages, exhibit substantially no indications of diminished desirable physical properties and are just as resilient as gaskets or O rings comprised of similar core materials, not covered with a sheath comprising a polymer of trifluorochloroethylene.

In forming the aforementioned gaskets or O rings, the core of the desired article is preformed from a selected non-metallic resilient solid material and, in accordance with a preferred modification, the polytrifluorochloroethylene plastic sheath is preformed by fabricating two one-half O rings, which are employed as shells for encasing the preformed core material. The term "one-half an O ring" is intended to denote a circular ring of trifluorochloroethylene plastic, split through the center plane to form one-half of the encasing shell. In another aspect, these two shells may comprise a pair of complementary torus-like shells, of more or less than half an O ring, and which may also be in the form of a non-circular section of an elliptical sheath. These one-half O rings, or a single member of the pair of complementary torus-like shells, are preformed by placing a previously weighed-out quantity of powdered or granular polytrifluorochloroethylene plastic within a die cavity and molded under suitable conditions of temperature and pressure according to compression molding techniques. The thus-formed one-half O ring, or torus-like shell member, is cooled and the aforementioned preformed core material is next superimposed upon the surface of this shell member, which is preferably grooved so that the core material may be snugly inserted therein. The remaining complementary one-half O ring, or torus-like shell, is now superimposed upon the above-mentioned one-half O ring, or torus-like shell, containing the core material. The core material, now encased within the two one-half O rings or pair of complementary torus-like shells, is molded in a die cavity having the shape of the desired gasket. The heat-sealed completely encased core material, comprising the finished gasket, is then cooled and removed from the die.

The aforementioned process of forming two fused homogeneous shells and then heat-sealing them, results in an encased O ring or gasket that has two heat-sealed seams, one around the inner circumference or surface, and the other around the outer circumference or surface of the finished gasket. These seams are not apparent to the naked eye, but physically exist and have been found to be weak points in the overall construction of the desired gasket article. Under conditions of operation, it has been found that, particularly at low temperatures, e. g., temperatures below about 0° F., that the sheath tends to come apart at the aforementioned seams, into the pair of half-shells or complementary torus-like members, from which it was molded.

It is, therefore, an object of this invention to provide an improved insulating composition in the form of a gasket.

Another object of the invention is to provide an improved insulating composition in the form of a gasket having structural elasticity and shape-retaining properties, which is resistant to chemical attack or deterioration and which will not undergo structural separation at low temperatures.

Still another object of the invention is to provide a method for preparing an improved insulating composition in the form of a gasket possessing the aforementioned desired characteristics.

Various other objects and advantages of the present invention will become apparent to those skilled in the art from the accompanying description and disclosure.

In accordance with the general process of this invention, the manufacture of the improved insulating composition or gasket in the form of an O ring or torus-like ring, entails the steps of separately preforming the core of the gasket (comprising the aforementioned selected non-metallic resilient solid material), and separately preforming the polytrifluorochloroethylene plastic sheath, in the form of two one-half O rings or complementary torus-like shells for subsequently encasing the preformed core material. The two sections of the sheath of the improved gasket, are preformed, as more fully hereinafter described, by compressing powdered or granular trifluorochloroethylene within a die cavity, of desired contour, at ambient temperature but under pressure sufficiently high to permit the particles of the plastic polymer to cohere, so that the sections comprising the sheath of the desired gasket, may be handled without breaking apart. The aforementioned preformed core material is next superimposed upon the surface of one of the preformed cold shell members, and the remaining complementary shell member is thus superimposed upon the aforementioned shell member containing the core material. The core material, encased within the two shell members, is molded in a die cavity having the shape of the desired gasket. After the molding cycle has been completed, the finished gasket is cooled and removed from the die. It has been found that gaskets, in the form of O rings or torus-like rings, prepared in accordance with the general process of the invention described above are obtained completely free of seams that would normally otherwise occur in heat-sealing molded polymer shells of trifluorochloroethylene to themselves, as has heretofore been the practice. The flow of the individual trifluorochloroethylene polymer particles into a fused singular O ring or torus-like ring, has been found to result in a more homogeneous product, of superior structural strength, which will not come apart at low temperatures.

As indicated above, the core of the improved insulating composition or gasket of the present invention, comprises a non-metallic resilient solid material having structural elasticity and shape-retaining properties, with a preferred overall modulus of elasticity of the same order as natural rubber. This core may, therefore, comprise such materials as natural rubbers; synthetic rubbers, e. g., neoprene; cork; asbestos; powdered minerals, e. g., talc, mica, soapstone, traprock or oyster shell; various clays, e. g., diatomaceous earths; and various thermoplastics, e. g., silicon resins, polymers of tetrafluoroethylene, or various combinations of the foregoing. When materials are employed for making the core of the improved gasket of the present invention which do not in themselves possess the required structural elasticity or shape-retaining properties, such as asbestos, powdered minerals, clays, etc., it is necessary to fabricate this core by suitable molding operations in conjunction with a binder which possesses the aforementioned elastic or shape-retaining properties, as more fully hereinafter described.

The actual formation of the core may be obtained by molding operations in which the powdered or granular core material is placed within the cavity of a die and heated to a temperature at which the material is flowable, and for a time sufficient to permit the material to assume the internal contour of the die. In instances where it is not desired to mold the powdered or granular core material, prior to its encasement within the shell members, this material may be pressed at sufficient pressure to form a closely adhering core of sufficient structural strength to enable this preformed core to be handled without breakage. For this purpose, particularly when the core material comprises powdered or granular tetrafluoroethylene, pressures, preferably not lower than 2,000 pounds per square inch are employed, although pressures as high as 20,000 pounds per square inch may also be utilized. The compressed core is then subjected to a sintering treatment to consolidate the tetrafluoroethylene particles, preferably employing temperatures between the softening temperature of tetrafluoroethylene and the temperature of decomposition, e. g., between about 700° F. and about 800° F. The finished molded core material (or sintered preformed core material as in the case of tetrafluoroethylene), having the contour of the desired gasket, is then removed from the die or sintering chamber and is then ready for further treatment in which the sheath of the trifluorochloroethylene polymer is applied thereon.

Another method of forming the desired core, may comprise forming extruded rods of the core material by conventional extrusion techniques, and subsequently employing these extruded rods in the operation hereinafter disclosed, for forming the desired gasket, covered with a sheath comprising a solid polymer of trifluorochloroethylene.

In connection with the aforementioned fabrication of the core of the improved gasket of the present invention, it has been pointed out that when materials are employed for making the core which do not in themselves possess the required structural elasticity or shape-retaining properties, it is necessary to fabricate this core, by suitable molding operations, in conjunction with a binder which possesses the aforementioned elastic or shape-retaining properties. Such a binder is preferably a polymer of trifluorochloroethylene, although other moldable plastics may also be employed for this purpose, such as polyamides, polyethylene, acrylic acids, and vinyl chloride acetates. Binders should be selected for this purpose whose molding temperature is below the decomposition temperature of the selected core material itself or filler. The core material (or filler) together with the moldable plastic material (or binder) are referred to as the composite. This composite may comprise filler in an amount between about 50% and about 95% by weight, and binder in an amount between about 5% and about 50% by weight. Expressed in another matter, the weight ratio of filler to binder should vary between about 1:1 and about 19:1. A preferred composite comprises a silicon resin, as a filler, in an amount of approximately 70% by weight and a polymer of trifluorochloroethylene in an amount of approximately 30% by weight as a binder.

When the core of the improved gasket comprises tetrafluoroethylene, a preferred composite comprises tetrafluoroethylene in an amount between about 50% by weight with the remaining 50% made up of any of the aforementioned filler materials, such as asbestos, etc., as previously described.

As indicated above, the core of the improved gasket of the present invention is covered with a relatively thin contiguous sheath comprising a polymer of trifluorochloroethylene. The prepartion of the monomer, trifluorochloroethylene, from which the desired solid polymer is obtained, is accomplished by dechlorinating Freon 113 (1, 1-2 trifluorotrichloroethane), under suitable conditions of dehalogenation in the presence of a solvent, such as methyl alcohol and a metallic dehalogenating agent, such as zinc dust, to produce an effluent comprising the monomer trifluorochloroethylene, including unreacted trifluorochloroethylene and solvent. This effluent is next passed to a suitable fractional distillation system in which substantially pure trifluorochloroethylene is recovered as a relatively low-boiling fraction.

The monomer thus obtained is polymerized under suitable polymerization conditions, with or without the presence of a suitable catalyst or promoter. Such conditions may include the use of a suitable catalyst comprising an organic peroxide, such as trifluorodichloropropionyl peroxide or bis-trichloroacetyl peroxide preferably dissolved in a suitable solvent, such as trichlorofluoromethane, at a temperature between about −20° C. and about 25° C., and preferably at a temperature of about −16° C. At a temperature of about −16° C. the polymerization of trifluorochloroethylene to the solid polymer is accomplished in about 7 days and in a suitable yield. At elevated temperatures, less time is required to complete the polymerization. After the desired extent of polymerization has taken place, the resulting polymerization reaction mixture is removed from the polymerization zone and the polymeric product is recovered from the solvent or the catalyst or polymerizing agent.

Polymers of trifluorochloroethylene possess certain desirable physical and chemical characteristics, with four-fifths of the weight being supplied by the halogens, fluorine and chlorine. These polymers are colorless, transparent, and have been found to possess a high chemical stability, with no effect being observed on the polymer after prolonged exposure to concentrated sulfuric, hydrofluoric and hydrochloric acids, strong caustic, fuming nitric acid, aqua regia, and other vigorous oxidizing materials. The polymer is hard but not brittle and is flowable at temperatures above about 500° F. In addition, the polymer is flexible and resilient, but is not wetted by water or affected by high humidity. The molding of these polymers requires a certain degree of care, inasmuch as they tend to change their physical characteristics to varying degrees under the influence of the molding conditions. Polymers of trifluorochloroethylene of varying molecular weight are produced by the method indicated above, by suitable control of conditions in polymerization.

As previously indicated, the polytrifluorochloroethylene plastic sheath is separately preformed, in the form of two one-half O rings or complementary torus-like shells for subsequently encasing the preformed core material. Each of these one-half O rings or torus-like shells is preformed by compressing powdered or granular trifluorochloroethylene within a die cavity at ambient temperature but under pressure which is sufficiently high to permit the particles of the plastic polymer to cohere. For this purpose a previously weighed-out quantity of powdered or granular polytrifluorochloroethylene plastic (depending upon the desired thickness of the half O ring or torus-like shell) is placed within a circular or elliptical or otherwise-shaped die cavity and subjected to pressures between about 500 and about 25,000 pounds per square inch, with pressures between about 5,000 and about 15,000 pounds per square inch being preferred. Coherence between the trifluorochloroethylene particles takes place almost immediately upon application of the required pressure. The resulting section comprising one of the members of the sheath of the desired gasket, may now be removed from the die and handled without breaking apart. The aforementioned preformed core material is next superimposed upon the surface of one of the preformed cold shell members; the remaining complementary shell member, similarly prepared as described above, is then superimposed upon the aforementioned shell member containing the core material, and the article thus obtained is now ready for molding into a seamless homogeneous sheath containing the aforementioned core and comprising the improved gasket of the present invention.

In fusing the two half O rings or torus-like shells of the improved gasket, in accordance with the present invention for the purpose of forming a seamless homogeneous shell, the gasket article is molded in a die cavity having the desired shape. In carrying out the molding or fusing operation of the solid polymer, the molding temperature is carefully selected by reference, directly or indirectly, to the molecular weight of the polymer to be molded. Temperatures in the range between about 415° F. and about 625° F. are satisfactory, but best results are obtained by selecting a molding temperature within this range which is the optimum temperature for the particular molecular weight of the polymer being molded.

It is impractical to ascertain the molecular weight for each polymer to be molded under normal circumstances. Accordingly, a simple test has been devised which provides a direct indication of the proper mold temperature. This test comprises measurements of the temperature at which no tensile strength is exhibited under the conditions of the test. The test is applied to standard or test pieces of the plastic material. This temperature is referred to as the "no strength temperature" or "no strength temperature value," and is abbreviated N. S. T. value and serves as a useful guide in the molding of plastics, and has particular applicability to plastics comprising essential polytrifluorochloroethylene. The measurement of the N. S. T. value is carried out in suitable apparatus on a strip of the plastic measuring 2" by ⅛" by 1⁄16". Conveniently, such strips may be notched or grooved in a straight line across one large surface at the center, transversely to the longitudinal axis. The notch, or groove, is made perfectly straight and extended to a depth of 1⁄64". The strength test is then applied to the point of minimum cross-section. The sample is suspended vertically, with a small weight (approximately 4" long), suspended from the lower end of the test on a fine wire. The above-mentioned weight is so adjusted that the total weight from the notch down is 0.5 gram. The test piece is suspended in a suitable chamber whose internal temperature is brought up to 410° F. The temperature is then raised at a rate of 2.7° F. per minute until the sample pulls apart at the notch. The N. S. T. value is the temperature at which the test strip is pulled in two. This determination is not highly sensitive to small variations in test strip thickness (±0.003"), however, care must be taken to cut sharp, clean notch of uniform depth. Differences of 10° F. are normally considered significant.

As previously indicated, the solid polymer of trifluorochloroethylene is molded at a temperature in the range between about 415° F. and about 625° F., for the purpose of forming a continuous covering or relatively thin contiguous sheath over the aforementioned core material. The particular molding temperature is selected by reference to the molecular weight of the polymer to be molded. Accordingly, the optimum operating conditions are determined by the particular N. S. T. value of the polytrifluorochloroethylene plastic may vary from about 220° C. to about 350° C. and that the polymers falling within this range of N. S. T. values may be satisfactorily treated under the above range of operating temperature conditions. In general, it has been found that as the N. S. T. value increases, the die temperature should also be increased (with the pressure remaining constant) to insure the best results. In a given instance, the pressure employed is that which is required to mold the material in a sufficiently short time at the temperature selected. It is found that the pressure required in molding at a temperature within the aforementioned range will fall within the range between about 700 and about 1400 pounds per square inch, although in certain instances pressures as low as 500 or as high as 25,000 pounds per square inch may also be employed. Thus, maintaining compacting pressure on the die between about 700 and 1400 pounds per square inch in each instance, it has been found that a polytrifluorochloroethylene plastic having an N. S. T. value of 240° C. can be satisfactorily pressed at temperatures between about 445° F. and about 500° F., while a polymer having an N. S. T. value of 270° C. is satisfactorily pressed at temperatures between about 465° F. and about 535° F. Polymers having an N. S. T. value of 300° C. are satisfactorily pressed at temperatures between about 480° F. and about 590° F. The polytrifluorochloroethylene plastic having a relatively low N. S. T. value, such as 240° C., flows easier at the molding temperature and produces a relatively harder finished article, while polymers having a relatively high N. S. T. value, such as 300° C., are more viscous at the molding temperature but produce a more flexible finished article.

The particular pressing time required for completely converting the stock and forming the finished article (that is, the desired gasket comprising a solid core covered with a contiguous sheath of the solid polymer of trifluorochloroethylene) under the selected operating conditions of temperature and pressure and based upon the respective N. S. T. value, is determined by the thickness of the polytrifluorochloroethylene covering or sheath which is to be formed. In general, the thickness of the polytrifluorochloroethylene sheath to be obtained should be within the range between about .001" and about .030", with a thickness of about .015" (±.003") being generally preferred.

As the N. S. T. value of the polytrifluorochloroethylene plastic increases, the molding or pressing time for a given thickness is also increased. It should be noted that as the pressing temperature is raised, the pressing time will decrease. Thus, for example, a polytrifluorochloroethylene plastic having an N. S. T. value of 300° C. can be pressed in one-half the time at 570° C., which approaches the upper limit of the preferred die temperature range of 480° F.–590° F., for a plastic having the aforementioned N. S. T. value of 300° C. In general, the pressing time for forming a covering or sheath of the polytrifluorochloroethylene plastic involves a matter of seconds to approximately two or three minutes.

In the description of the operating conditions for carrying out the above molding procedure in forming a relatively thin contiguous covering or sheath of the polytrifluorochloroethylene plastic to be encased around the core of the desired gasket, the stock to be treated is a plastic composed essentially of polytrifluorochloroethylene. It should be understood, however, that fillers and plastic compositions other than the polymers of the present invention which do not materially affect the characteristics of polytrifluorochloroethylene may also be incorporated in the plastic material treated, and that the treatment of such compositions is also within the scope of this invention. In this respect, it has also be found desirable to incorporate plasticizing agents with the polytrifluorochloroethylene plastic to be molded, employing such plasticizers as polytrifluorochloroethylene itself but in an oily or waxy state. When incorporating such plasticizing agents with the polytrifluorochloroethylene plastic to be molded, it is possible to employ the lower temperatures within the aforementioned ranges for a given N. S. T. value of polytrifluorochloroethylene. From an economic standpoint, it is generally preferred to conduct the molding operation at as low a temperature as possible.

Figure 2:
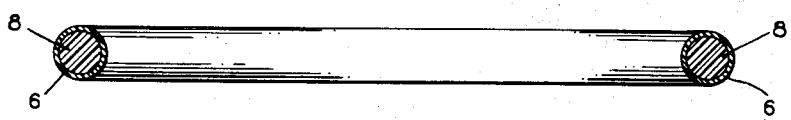
Figure 3:
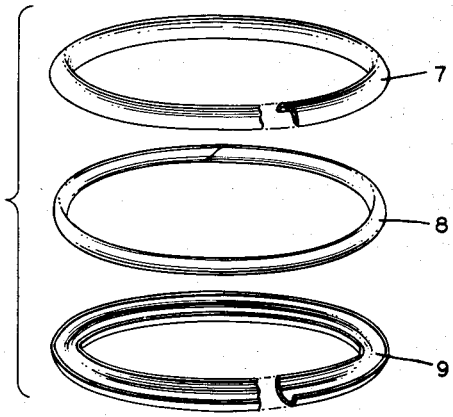

The structure of the improved insulating composition or gasket of the present invention, in the aforementioned preferred embodiment of an O ring, is shown in Figures 1, 2 and 3 of the accompanying drawing.

Figure 1 is a plan view of the improved gasket or O ring of the present invention.

Figure 2 is a detailed cross-sectional view of the improved gasket, taken along the line 2—2 of Figure 1. In Figure 2 is shown the resilient solid core material 8 of the gasket, covered with a relatively thin contiguous and homogeneous seamless sheath or shell 6 comprising a solid polymer of trifluorochloroethylene.

Figure 3 is an exploded perspective view of the structural components of the improved gasket or O ring. In Figure 3 are shown grooved one-half O rings or shells 7 and 9, comprising cold-pressed polytrifluorochloroethylene plastic and the aforementioned core material 8, having a slightly smaller diameter than the outside periphery of the one-half O rings 7 and 9, but of such diameter as to fit snugly within the grooves of the one-half O ring shells.

While a particular embodiment of the present invention has been described for the purpose of illustration, it should be understood that various modifications and adaptations thereof which will be obvious to one skilled in the art may be made without departing from the spirit of the invention.

Having thus described my invention, I claim:

1. A method for forming a gasket comprising: forming a relatively large core comprising a non-metallic resilient solid material; compressing a mass comprising a finely divided solid polymer of trifluorochloroethylene having a no strength temperature value between about 220° C. and about 350° C. at a temperature substantially below 415° F. in the form of toroidal half-shells comprising an adherent unfused mass of said finely divided solid polymer; cover said core with a complementary pair of said toroidal half-shells; heating the resulting article in a die maintained at a temperature between about 415° F. and about 625° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

2. The method of claim 1 wherein said non-metallic resilient solid material comprises a silicone resin.

3. The method of claim 1 wherein said non-metallic resilient solid material comprises tetrafluoroethylene.

4. The method of claim 1 wherein said non-metallic resilient solid material comprises cork.

5. The method of claim 1 wherein said non-metallic resilient solid material comprises asbestos.

6. The method of claim 1 wherein said non-metallic resilient solid material comprises a powdered mineral.

7. A method for forming a gasket comprising: forming a relatively large core comprising a non-metallic resilient solid material; compressing a mass comprising a finely divided solid polymer of trifluorochloroethylene having a no strength temperature value between about 240° C. and about 300° C. at a temperature substantially below 415° F. in the form of toroidal half-shells comprising an adherent unfused mass of said finely divided solid polymer; covering said core with a complementary pair of said toroidal half-shells; heating the resulting article in a die maintained at a temperature between about 445° F. and about 590° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

8. A method for forming a gasket comprising: forming a relatively large core comprising a non-metallic resilient solid material as a filler and a solid polymer of trifluorochloroethylene having an N. S. T. value between about 220° C. and about 350° C. as a binder in a weight ratio of filler to binder varying between about 1:1 and about 1:19; compressing a mass comprising a finely divided solid polymer of trifluorochloroethylene having a no strength temperature value between about 220° C. and about 350° C. at a temperature substantially below 415° F. in the form of toroidal half-shells comprising an adherent unfused mass of said finely divided solid polymer; covering said core with a complementary pair of said toroidal half-shells; heating the resulting article in a die maintained at a temperature between about 415° F. and about 625° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

9. A method for forming a gasket comprising: forming a relatively large core comprising a non-metallic resilient solid material as a filler and a solid polymer of trifluorochloroethylene having an N. S. T. value between about 220° C. and about 350° C. as a binder in a weight ratio of filler to binder varying between about 1:1 and about 1:19; compressing a mass comprising a finely divided solid polymer of trifluorochloroethylene having a no strength temperature value between about 240° C. and about 300° C. at a temperature substantially below 415° F. in the form of toroidal half-shells comprising an adherent unfused mass of said finely divided solid polymer; covering said core with a complementary pair of said toroidal half-shells; heating the resulting article in a die maintained at a temperature between about 445° F. and about 590° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

10. A method for forming a gasket comprising: forming a relatively large core comprising a non-metallic resilient solid material; compressing a mass comprising a finely divided solid polymer of trifluorochloroethylene having an N. S. T. value between about 220° C. and about 350° C. at a temperature substantially below 415° F. and at a pressure between about 500 and about 25,000 pounds per square inch in the form of toroidal half-shells comprising an adherent unfused mass of said finely divided solid polymer; covering said core with a complementary pair of said toroidal half shells; heating the resulting article in a die maintained at a temperature between about 415° F. and about 625° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

11. A method for forming a gasket comprising: forming a relatively large core comprising a non-metallic resilient solid material; compressing a mass comprising a finely divided solid polymer of trifluorochloroethylene having a no strength temperature value between about 220° C. and about 350° C. at a temperature substantially below 415° F. and at a pressure between about 5,000 and about 15,000 pounds per square inch in the form of toroidal half-shells comprising an adherent unfused mass of said finely divided solid polymer; covering said core with a complementary pair of said torus-like shells; heating the resulting article in a die maintained at a temperature between about 415° F. and about 625° F. and under compacting pressure between about 500 and about 25,000 pounds per square inch for a time sufficient to fuse said mass of said finely divided solid polymer and bond said toroidal half-shells together into the form of a gasket having a seamless homogeneous sheath about said core; and removing the gasket thus formed from said die.

12. A method for forming a gasket comprising: forming a relatively large core comprising a non-metallic resilient solid material; compressing a mass comprising a finely divided solid polymer of trifluorochloroethylene having a no strength temperature value between about 240° C. and about 300° C. at a temperature substantially below 415° F. and at a pressure between about 5,000 and about 15,000 pounds per square inch in the form of toroidal half-shells comprising an adherent unfused mass of said finely divided solid polymer; covering said core with a complementary pair of said toroidal half-shells; heating the resulting article in a die maintained at a temperature between about 445° F. and about 590° F. and under compacting pressure between about 700 and about 1400 pounds per square inch for a time sufficient to fuse said mass of said finely divided solid polymer and bond said toroidal half-shells together into the form of a gasket having a seamless homogeneous sheath about said core; and removing the gasket thus formed from said die.

13. A method for forming a gasket comprising: forming a relatively large core comprising a silicone resin as a filler and a solid polymer of trifluorochloroethylene having an N. S. T. value between about 220° C. and about 350° C. as a binder in a weight ratio of filler to binder varying between about 1:1 and about 1:19; compressing a mass comprising a finely divided solid polymer of trifluorochloroethylene having a no strength temperature value between about 240° C. and about 300° C. at a temperature substantially below 415° F. and at a pressure between about 5,000 and about 15,000 pounds per square inch in the form of toroidal half-shells comprising an adherent unfused mass of said finely divided solid polymer; covering said core with a complementary pair of said toroidal half-shells; heating the resulting article in a die maintained at a temperature between about 445° F. and about 590° F. and under compacting pressure between about 700 and about 1400 pounds per square inch for a time sufficient to fuse said mass of said finely divided solid polymer and bond toroidal half-shells together into the form of a gasket having a seamless homogeneous sheath about said core; and removing the gasket thus formed from said die.

14. The gasket produced by the method of claim 1.
15. The gasket produced by the method of claim 7.
16. The gasket produced by the method of claim 13.

References Cited in the file of this patent

UNITED STATES PATENTS

| | | |
|---|---|---|
| 2,358,259 | Siedschlag et al. | Sept. 12, 1944 |
| 2,392,389 | Joyce | Jan. 8, 1946 |
| 2,440,190 | Alfthan | Apr. 20, 1948 |
| 2,459,721 | Poltorak | Jan. 18, 1949 |
| 2,538,808 | Swiss | Jan. 3, 1951 |
| 2,597,976 | Cousins | May 27, 1952 |